(12) United States Patent
Cui et al.

(10) Patent No.: US 11,380,035 B2
(45) Date of Patent: Jul. 5, 2022

(54) METHOD AND APPARATUS FOR GENERATING MAP (71) Applicant: BAIDU ONLINE NETWORK TECHNOLOGY (BEIJING) CO., LTD., Beijing (CN)

(72) Inventors: Yong Cui, Beijing (CN); Juntao Tong, Beijing (CN); Donglin Wu, Beijing (CN); Yi Zeng, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 72 days.

(21) Appl. No.: 17/015,916

(22) Filed: Sep. 9, 2020

(65) Prior Publication Data

US 2021/0192815 A1    Jun. 24, 2021

(30) Foreign Application Priority Data

Dec. 23, 2019 (CN) .......................... 201911343925.5

(51) Int. Cl.
*G06V 20/00* (2022.01)
*G06T 11/60* (2006.01)
*G09B 29/10* (2006.01)

(52) U.S. Cl.
CPC .............. *G06T 11/60* (2013.01); *G06V 20/00* (2022.01); *G09B 29/106* (2013.01)

(58) Field of Classification Search
None
See application file for complete search history.

(56) References Cited

U.S. PATENT DOCUMENTS 7,127,107 B2 * 10/2006 Kubota ..................... G06T 7/66
382/199
9,623,905 B2 * 4/2017 Shashua ............... G05D 1/0251
(Continued)

FOREIGN PATENT DOCUMENTS

| CN | 103150759 A | 6/2013 |
| CN | 105512646 A | 4/2016 |

(Continued)

OTHER PUBLICATIONS

Extended European Search Report for EP Application No. 20195003.7, dated Mar. 3, 2021, 9 pages.
(Continued)

*Primary Examiner* — David H Chu
(74) *Attorney, Agent, or Firm* — Fay Sharpe LLP (57) ABSTRACT

The present disclosure discloses a method and an apparatus for generating a map, relating to a field of intelligent transportation technologies in the field of computer technologies. The method includes the following. A street view image corresponding to a target road is obtained. The street view image is input into a preset deep learning model to obtain data of a candidate isolation belt corresponding to the street view image. The data of the candidate isolation belt includes information of the candidate isolation belt and a probability corresponding to the information of the candidate isolation belt. The information of the candidate isolation belt is corrected based on a preset correction strategy and the probability to obtain information of a target isolation belt. An icon corresponding to the information of the target isolation belt is added on a base map including the target road to generate a map.

17 Claims, 5 Drawing Sheets

(56) References Cited

U.S. PATENT DOCUMENTS

| | | | |
|---|---|---|---|
| 10,976,747 B2* | 4/2021 | Viswanathan | G05D 1/0088 |
| 2005/0100220 A1* | 5/2005 | Keaton | G06T 7/11 |
| | | | 382/191 |
| 2007/0226243 A1* | 9/2007 | Fuki | G01C 21/32 |
| | | | 707/999.102 |
| 2008/0262721 A1* | 10/2008 | Guo | G01C 21/32 |
| | | | 701/532 |
| 2010/0079590 A1* | 4/2010 | Kuehnle | G06T 7/60 |
| | | | 340/436 |
| 2011/0280453 A1* | 11/2011 | Chen | G06T 7/75 |
| | | | 382/113 |
| 2012/0065878 A1* | 3/2012 | Yeh | G01C 21/32 |
| | | | 701/400 |
| 2012/0155745 A1* | 6/2012 | Park | G06V 20/176 |
| | | | 382/154 |
| 2013/0328924 A1* | 12/2013 | Arikan | G06T 11/00 |
| | | | 345/629 |
| 2015/0363645 A1* | 12/2015 | Chen | G06T 7/50 |
| | | | 382/173 |
| 2016/0299208 A1 | 10/2016 | Shitgeta et al. | |
| 2017/0069092 A1* | 3/2017 | Bell | G06V 20/10 |
| 2017/0294036 A1* | 10/2017 | Dorum | G06T 11/203 |
| 2018/0023960 A1* | 1/2018 | Fridman | G06T 7/37 |
| | | | 382/104 |
| 2018/0188043 A1* | 7/2018 | Chen | G06T 7/55 |
| 2018/0224863 A1* | 8/2018 | Fu | G06V 20/588 |
| 2018/0342053 A1 | 11/2018 | Balagurusamy et al. | |
| 2018/0365858 A1* | 12/2018 | Kim | G06T 7/80 |
| 2018/0365859 A1* | 12/2018 | Oba | G06T 7/85 |
| 2019/0130182 A1* | 5/2019 | Zang | G06V 20/182 |
| 2021/0012548 A1* | 1/2021 | Jiang | G06T 11/206 |
| 2021/0048819 A1* | 2/2021 | Choi | G05D 1/0246 |
| 2021/0061304 A1* | 3/2021 | Braunstein | G08G 1/167 |

FOREIGN PATENT DOCUMENTS

| | | |
|---|---|---|
| CN | 106909562 A | 6/2017 |
| CN | 109448373 A | 3/2019 |
| EP | 1530025 A2 | 5/2005 |
| JP | 2012037455 A | 2/2012 |
| JP | 2015045622 A | 3/2015 |
| JP | 2016029553 A | 3/2016 |
| JP | 2019512824 A | 5/2019 |
| WO | 2019073024 A1 | 4/2019 |
| WO | 2019222358 A1 | 11/2019 |

OTHER PUBLICATIONS

Jan D. Wegner et al., "Cataloging Public Objects Using Aerial and Street-Level Images—Urban Trees", Jun. 27, 2016, IEEE Conference on Computer Vision and Pattern Recognition, 10 pages.

Stephen Law et al., "Take a Look Around: Using Street View and Satellite Images to Estimate House Prices", Oct. 21, 2019, 19 pages.

Office Action for Japanese Application No. 2020-213102, dated Nov. 30, 2021, 6 pages.

Office Action for Chinese Application No. 201911343925.5, dated Feb. 25, 2022, 8 pages.

* cited by examiner

METHOD AND APPARATUS FOR GENERATING MAP

CROSS REFERENCE TO RELATED APPLICATIONS

This application claims priority and benefits to Chinese Application No. 201911343925.5, filed on Dec. 23, 2019, the entire content of which is incorporated herein by reference.

FIELD

The present disclosure relates to the field of intelligent transportation technologies in data processing technologies, and more particularly, to a method and an apparatus for generating a map.

BACKGROUND

With the development of computer technologies, electronic maps are increasingly needed by users, for guiding the users to the destination.

SUMMARY

Embodiments of the present disclosure provide a method for generating a map. The method includes obtaining a street view image corresponding to a target road; inputting the street view image into a preset recognition model to obtain data of a candidate isolation belt corresponding to the street view image, in which the data of the candidate isolation belt includes information of the candidate isolation belt and a probability corresponding to the information of the candidate isolation belt; correcting the information of the candidate isolation belt based on a preset correction strategy and the probability to obtain information of a target isolation belt; and adding an icon corresponding to the information of the target isolation belt on a base map including the target road to generate a map.

Embodiments of the present disclosure provide an electronic device. The electronic device includes at least one processor and a storage device communicatively connected to the at least one processor. The storage device stores an instruction executable by the at least one processor. When the instruction is executed by the at least one processor, the at least one processor is configured to perform the method for generating a map according to the embodiments described above.

Embodiments of the present disclosure provide a non-transitory computer-readable storage medium having a computer instruction stored thereon. The computer instruction is configured to cause a computer to perform the method for generating a map according to the embodiments described above.

Other effects of the above optional implementations will be described below in combination with specific embodiments.

BRIEF DESCRIPTION OF THE DRAWINGS

The accompanying drawings are used for better understanding embodiments of the present disclosure, and do not constitute a limitation of the present disclosure.

2

DETAILED DESCRIPTION

Exemplary embodiments of the present disclosure are described below with reference to the accompanying drawings, which include various details of the embodiments of the present disclosure to facilitate understanding, and should be considered as merely exemplary. Therefore, those skilled in the art should recognize that various changes and modifications may be made to the embodiments described herein without departing from the scope and spirit of the present disclosure. Also, for clarity and conciseness, descriptions of well-known functions and structures are omitted in the following description.

In related arts, electronic map is configured to guide users to travel by using simple route signs. The route signs mainly correspond to roads and directions of travelling. However, in reality, in order to ensure safety, requirements on refined map services are becoming higher and higher. Consequently, it is difficult to meet requirements on providing refined services by simply providing map representations focusing only on roads.

In view of the above, embodiments of the present disclosure provide a method and an apparatus for generating a map, which will be described below with reference to the accompanying drawings.

The present disclosure may have the following advantages and beneficial effects. The street view image corresponding to the target road is obtained and input into the preset recognition model to obtain the data of the candidate isolation belt corresponding to the street view image. The data of the candidate isolation belt includes the information of the candidate isolation belt and the probability corresponding to the information of the candidate isolation belt. The information of the candidate isolation belt is corrected based on the preset correction strategy and the probability to obtain the information of the target isolation belt. The icon corresponding to the information of the target isolation belt is added on the base map including the target road to generate the map. Consequently, the information of the isolation belt may be accurately marked on the map, thereby enhancing the navigation performance of the map.

In order to improve refined services of a map, embodiments of the present disclosure propose a method for generating a refined map, which may identify an isolation belt and display the isolation belt on the map. The isolation belt may include physical objects existing on roads for isolation, such as green belts and fences, and virtual isolation belts, such as yellow lines.

Figure 1:
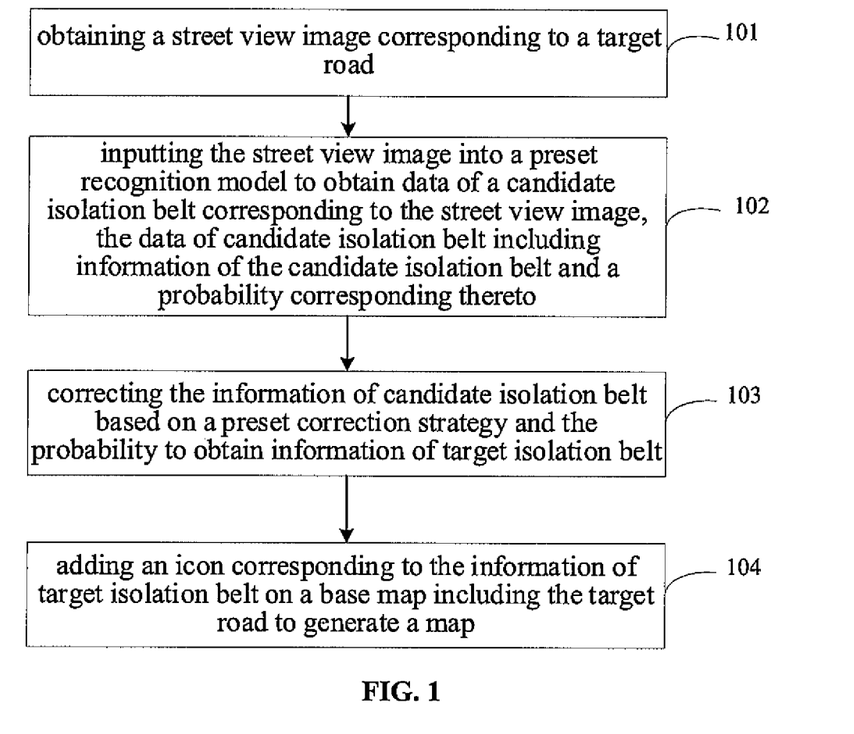
FIG. 1 is a flowchart illustrating a method for generating a map according to embodiments of the present disclosure.

In detail, FIG. 1 is a flowchart illustrating a method for generating a map according to embodiments of the present disclosure. As illustrated in FIG. 1, the method may include the following.

At block 101, a street view image corresponding to a target road is obtained.

In detail, in order to accurately identify the isolation belt, a captured street view image may be taken as an image of the target road. For example, the street view image may be captured based on a preset capturing interval. The preset capturing interval may be an interval related to time or an interval related to road distance.

In order to ensure that the captured street view image may include an image of isolation belts of the target road, parameters for capturing the street view image may be determined based on a traffic direction (such as going northwards or southwards straightly, etc.) and a road type (such as a main road, a side road, etc.) of the current target road. The parameters may include the moving direction (MoveDir), a roll angle (Roll), and a field of view (Fov) of a vehicle that is configured to capture the street view image. The street view image may be captured based on the parameters for capturing the street view image.

Figure 2:
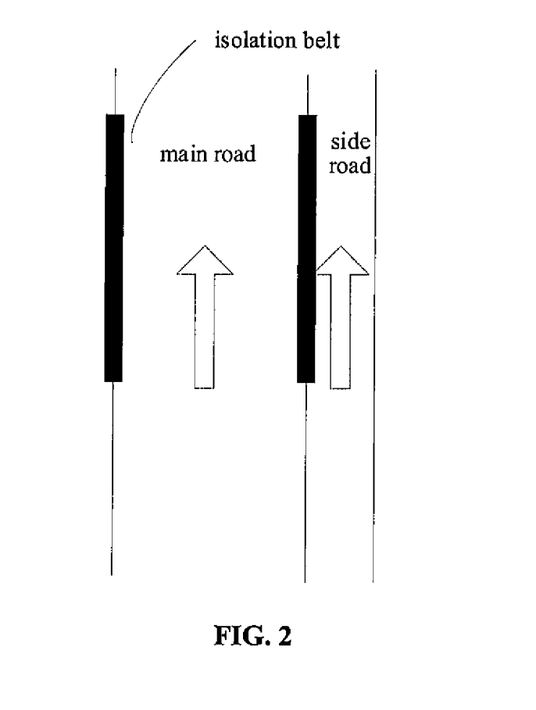
FIG. 2 is a schematic diagram illustrating a scenario for implementing a method for generating a map according to embodiments of the present disclosure.

The reason for capturing the street view image in the above manner is that the arrangement of the isolation belts is related to the traffic direction indicated by the road and the road type of the road. For example, as illustrated in FIG. 2, for the isolation belts between main roads, the isolation belts may be arranged on the left side of the traffic direction indicated by the main road, while for the isolation belts between the main road and a side road, the isolation belts may be arranged on the right side of the traffic direction indicated by the main road (i.e., the left side of the traffic direction indicated by the side road). In order to ensure that the street view data may cover both sides of the road, corresponding parameters for capturing the street view image may be determined to enable that the street view data recently collected may be obtained as much as possible. Certainly, in an actual practice of capturing the street view image, it is necessary to ensure that a time interval between two adjacent captures of the street view images is not too long, and ensure that roadside data of the two adjacent captures of the street view images are continuous (without losing any feature information of the road).

In an actual practice of capturing the street view image, in order to avoid that unnecessary information, such as a sky scene or a ground scene, is included in the captured street view image, the parameters for capturing the street view image may also be set based on width of the target road to allow that not too much noise information are covered by a range of view angle.

At block 102, the street view image is input into a preset recognition model to obtain data of a candidate isolation belt corresponding to the street view image. The data of the candidate isolation belt includes information of the candidate isolation belt and a probability corresponding to the information of the candidate isolation belt.

It may be understood that the preset recognition model may be a pre-trained deep learning model. During training the deep learning model, manually marked samples of the street view image may be input therein. The deep learning model may be repeatedly or iteratively trained based on comparison results between output results and marked information. In order to avoid overfitting of the model being trained, and to ensure that the manually marked samples inputted in advance into the model cover various types of information of the isolation belt, the deep learning module may be trained based on the comparison result with respect to each type of the information of isolation belt. When it is determined that an accuracy rate for training the model based on the comparison result with respect to a certain type is relatively low, additional samples of the street view image of this type may be provided for training the model. Certainly, in order to improve robustness of the model, samples of the street view image related to different lighting conditions or different road conditions may be provided.

In detail, after the training of the deep learning model is completed, the street view image may be input into the preset deep learning model to obtain the data of isolation belts corresponding to the street view image. The data of the candidate isolation belt may include the information of candidate isolation belt and the probability corresponding to the information of candidate isolation belt. The information of candidate isolation belt may include a type of the candidate isolation belt and a position of the candidate isolation belt. The above probability corresponds to a confidence of the information of isolation belt. The higher the probability is, the higher the confidence is.

Certainly, in an example of the present disclosure, a convolutional neural network model may also be used as the pre-trained model. The model may be trained relying on the deep learning platform, such as Paddle, by using the convolutional neural network. Samples of the data of isolation belt of several roads may be randomly selected from training samples to train the model. Every time the training using one training sample is finished, the convolutional neural network model may be used to evaluate an accuracy of a test set to analyze a change trend of the accuracy of the model. If the accuracy of the convolutional neural network is not significantly improved, the training is stopped, and an accuracy of the convolutional neural network is analyzed. Samples of the data of isolation belt is added to iteratively improve the accuracy of the convolutional neural network.

At block 103, the information of the candidate isolation belt is corrected based on a preset correction strategy and the probability to obtain information of a target isolation belt.

In detail, the data of candidate isolation belt output by the deep learning model is only used as a reference, since when a camera is capturing the street view image, a problem such as that the capturing field of view of the camera may be blocked may exist. Consequently, the information of the candidate isolation belt may be corrected based on the preset correction strategy and the probability to obtain the information of target isolation belt.

It should be noted that in different application scenarios, there may be different ways to correct the information of the candidate isolation belt based on the preset correction strategy and the probability to obtain the information of the target isolation belt. Examples are given as follows.

Figure 3:
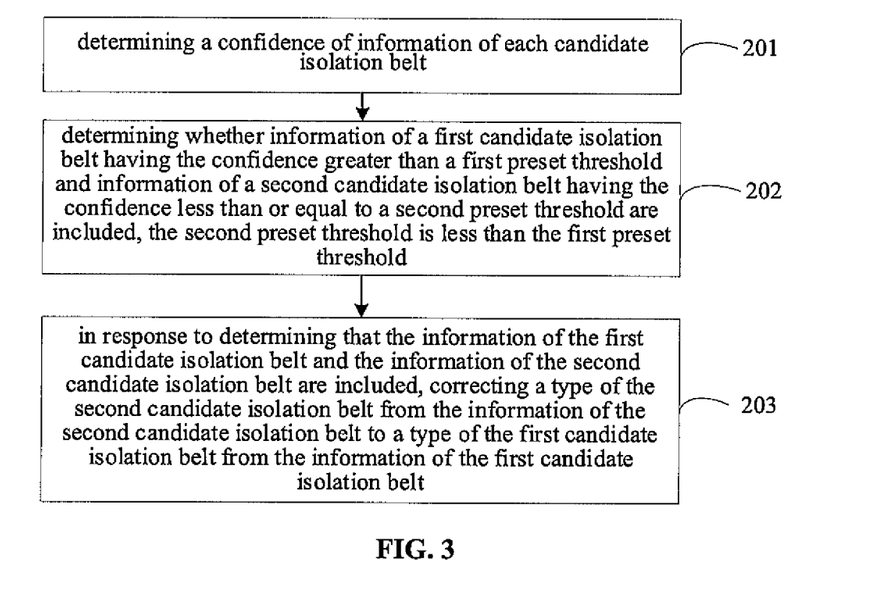
FIG. 3 is a flowchart illustrating a method for generating a map according to embodiments of the present disclosure.

In an example, when multiple candidate isolation belts are included, as illustrated in FIG. 3, the block 103 may include the following.

At block 201, a confidence of the information of each candidate isolation belt is determined.

In detail, the confidence of the information of each candidate isolation belt may be determined so as to know whether this information of the candidate isolation belt may be adopted.

In a possible example, as described above, the information of the candidate isolation belt may include the type of the candidate isolation belt. Therefore, the pieces of information of the multiple candidate isolation belts may be divided into at least one set of information based on the type of each candidate isolation belt included in the information of each candidate isolation belt. For each set, the type of the candidate isolation belt is the same to each other within the said set. The number of pieces of information included in each set may be determined, and the confidence of the information of each candidate isolation belt included in each set may be determined based on the number.

It may be easily understand that, on the road, especially the highway, types of the isolation belts are generally the same on the same side of the road. Therefore, in embodiments, the confidence of the information of each candidate isolation belt may be determined based on the number corresponding to the type of that candidate isolation belt. A ratio of the number to a total number of pieces of information of the candidate isolation belts may be determined. One candidate isolation belt may correspond to one piece of information of the candidate isolation belt. The confidence of the information of candidate isolation belt may be determined based on a relationship between the ratio and the confidence established in advance. For example, 10 candidate isolation belts are recognized from the target road, including 7 green belts and 3 fences, and 10 pieces of information correspond to the 10 candidate isolation belts respectively. It may be determined that the confidence of the information of the green belt is higher than that of the information of the fence.

Certainly, in this example, the probability corresponding to the information of candidate isolation belt may be also a reference to be considered. Therefore, for each set, all probabilities corresponding to the information of the candidate isolation belts included in that set may be averaged as an average value, and the confidence may be corrected based on the average value. For example, when it is determined that the average value of probabilities is relatively large, an increment of the confidence corresponding to the average value may be determined based on a relationship established in advance. Further, the increment of the confidence may be added to the average value of probabilities as a final confidence. In this example, in order to avoid the influence of some noise parameters, the average value of probabilities may be determined after a maximum value and a minimum value are removed from the probabilities of all pieces of information of candidate isolation belts in each set.

In this example, before determining the confidence of the information of each candidate isolation belt included in each set based on the number, a position of each candidate isolation belt may be determined. The number of continuous and adjacent candidate isolation belts may be determined based on the position of each candidate isolation belt. The confidence may be corrected based on the number of continuous and adjacent candidate isolation belts. That is to say, in this example, when the types of continuous and adjacent candidate isolation belts are same to each other, the information of candidate isolation belt may be considered to be reliable. For example, a corresponding relationship between the number and the increment of the confidence may be established, such that a corresponding increment may be added to the confidence as the final confidence.

Figure 4:
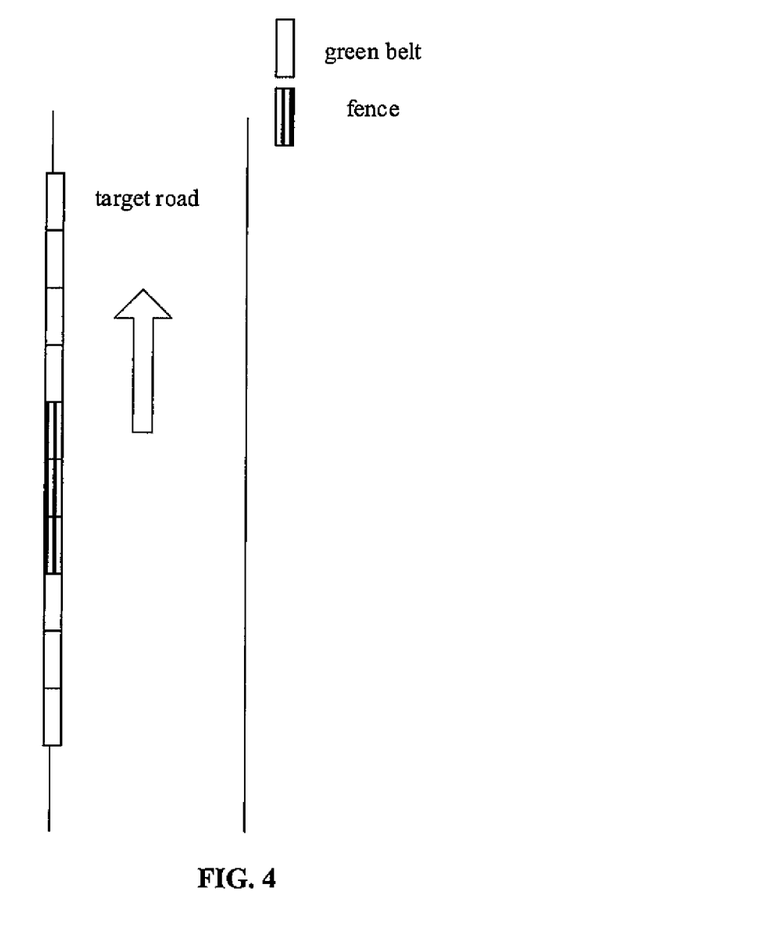
FIG. 4 is a schematic diagram illustrating a scenario for implementing a method for generating a map according to embodiments of the present disclosure.

For example, as illustrated in FIG. 4, continued to the above example, 10 candidate isolation belts may be recognized from the target road, including 7 green belts and 3 fences. The confidence of the fence may be considered to be higher than that of the green belt since the three fences are adjacent to each other. Therefore, a certain value may be added to the confidence as the final confidence.

In an actual practice, in this example, during correcting the confidence based on an adjacency of positions of isolation belts that have the same type, probabilities of information of adjacent candidate isolation belts may be used. For example, the increment may be obtained based on an average value of probabilities of information of adjacent and continuous candidate isolation belts and the increment may be added to the confidence as the final confidence.

At block 202, it is determined whether information of a first candidate isolation belt having the confidence greater than a first preset threshold and information of a second candidate isolation belt having the confidence less or equal to a second preset threshold are included. The second preset threshold is less than the first preset threshold.

In detail, after the confidence is determined, it is determined whether the information of multiple candidate isolation belts include the information of the first candidate isolation belt having the confidence greater than the first preset threshold and the information of the second candidate isolation belt having the confidence less than or equal to the second preset threshold. The second preset threshold is less than the first preset threshold.

At block 203, in response to that the information of the first candidate isolation belt and the information of the second candidate isolation belt are included, a type corresponding to the second candidate isolation belt included in the information of the second candidate isolation belt is corrected to a type of corresponding to the first candidate isolation belt included in the information of the first candidate isolation belt.

In detail, in response to that the information of the multiple candidate isolation belts include the information of the first candidate isolation belt and the information of the second candidate isolation belt, the type of the second candidate isolation belt is corrected to the type corresponding to the first candidate isolation belt, thereby avoiding effects of some noises. For example, 10 candidate isolation belts are identified from the target road, including 7 green belts and 3 fences. The confidence of the information of the fence is lower than that of the information of the green belt. Therefore, the type of isolation belt corresponding to the fence is corrected to the type of the isolation belt corresponding to the green belt, that is, the fence is corrected to the green belt.

In an example of the present disclosure, if the information of the first candidate isolation belt is not included, while the information of the second candidate isolation belt is included, a user may be informed of manually checking whether the information of the second candidate isolation belt is correct. If the information of the first candidate isolation belt is included, but the information of the second candidate isolation belt is not included, the types of all candidate isolation belts are kept.

In another possible example, as described above, the information of the candidate isolation belt may also include the position of isolation belt. The position of isolation belt may be a coordinate position or a position relative to the target road. Data of a reference isolation belt corresponding to the information of the candidate isolation belt may be obtained. The data of the reference isolation belt may be obtained from a road adjacent to the target road. A traffic direction indicated by the target road may be opposite to that of the adjacent road. Consequently, it may be determined whether the information of the candidate isolation belt from the data of the candidate isolation belt is consistent with information of the reference isolation belt from the data of the reference isolation belt, at the same position of isolation belt. Information of an inconsistent candidate isolation belt may be determined, and it is determined whether the probability of the information of the inconsistent candidate isolation belt is greater than or equal to the probability of the information of the corresponding reference isolation belt. When the probability of the information of the inconsistent candidate isolation belt is greater than or equal to the probability of the information of the corresponding reference isolation belt, the information of the inconsistent candidate isolation belt is corrected to the information of the reference isolation belt. That is, in embodiments, at the same position of isolation belt, the information of isolation belt having a higher probability may be selected from the information of isolation belt recognized from the target road and the adjacent road and adopted.

Figure 5:
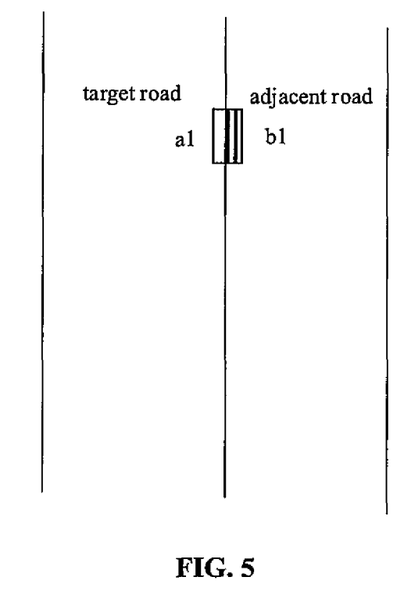
FIG. 5 is a schematic diagram illustrating a scenario for implementing a method for generating a map according to embodiments of the present disclosure.

For example, as illustrated in FIG. 5, for the target road A and the adjacent road B (for example, the traffic directions indicated by the target road A and the adjacent road B are opposite to each other), if the information of the candidate isolation belt a1 identified from the target road A is inconsistent to the information of candidate isolation belt b1 identified from the adjacent road B, where the position of the candidate isolation belt a1 is the same to the candidate isolation belt b, and the probability of the information of a1 is 20% and the probability of the information of b1 is 80%, the type of a1 may be changed to the type corresponding to b1.

At block 104, an icon corresponding to the information of the target isolation belt is added on a base map including the target road to generate a map.

In detail, after the information of the target isolation belt is generated, the icon corresponding to the target isolation belt is added to the base map including the target road. The icon may be a preset standard icon corresponding to the type of the target isolation belt. For example, on the road of the map, in addition to common road division lines, corresponding information of isolation belt may be marked, such that the user may intuitively see the green belt on the road of the map. In embodiments of the present disclosure, a region corresponding to the green belt of the street view image may be scaled down based on a size of the map and displayed at a corresponding position of the map to increase the reality of the map.

In embodiments of the present disclosure, in order to ensure the accuracy of the recognized information of the target isolation belt, driving information of the user on the target road within a preset time period may also be provided. According to a trajectory formed by the driving information, it may be determined whether a behavior such as crossing the target isolation belt occurs. If such a behavior occurs, it is indicated that the information of the target isolation belt is not reliable. As a result, the position of the target isolation belt may be re-evaluated. For example, according to the driving trajectory of the user, it may be determined whether a behavior, such as avoiding the target isolation belt or making a U-turn occurs, to determine whether the information of the target isolation belt is reliable, thereby correcting untrusted information of target isolation belt.

With the method for generating a map according to embodiments of the present disclosure, the street view image corresponding to the target road is obtained. The street view image is input into the preset recognition model to obtain the data of the candidate isolation belt corresponding to the street view image. The data of the candidate isolation belt includes the information of the candidate isolation belt and the probability corresponding to the information of the candidate isolation belt. The information of the candidate isolation belt is corrected based on the preset correction strategy and the probability to obtain the information of the target isolation belt. The target isolation belt is marked on the base map including the target road with the icon to generate the map. Consequently, the information of the isolation belts may be accurately marked on the map, and the navigation performance of the map is enhanced.

Figure 6:
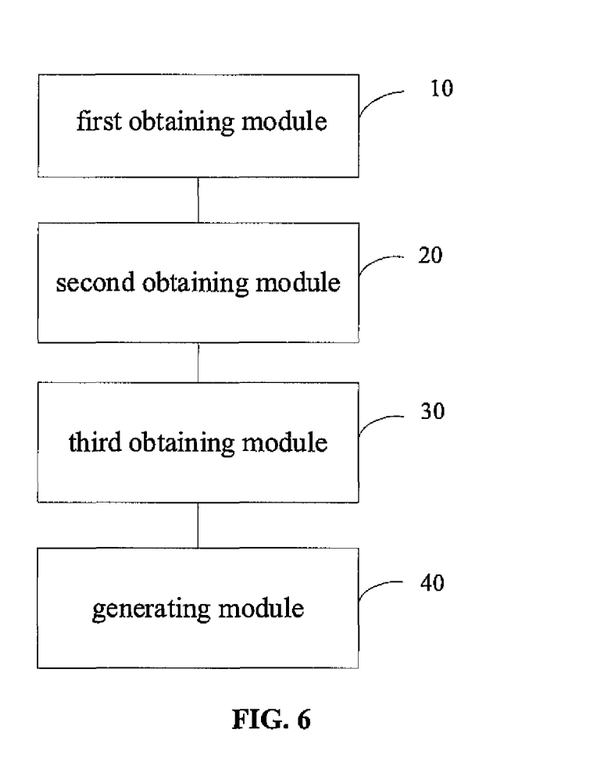
FIG. 6 is a block diagram illustrating an apparatus for generating a map according to embodiments of the present disclosure.

To implement the above embodiments, embodiments of the present disclosure further provide an apparatus for generating a map. FIG. 6 is a block diagram illustrating an apparatus for generating a map according to embodiments of the present disclosure. As illustrated in FIG. 6, the apparatus may include a first obtaining module 10, a second obtaining module 20, a third obtaining module 30 and a generating module 40.

The first obtaining module 10 may be configured to obtain a street view image corresponding to a target road.

The second obtaining module 20 may be configured to input the street view image into a preset recognition model to obtain data of a candidate isolation belt corresponding to the street view image. The data of the candidate isolation belt may include information of the candidate isolation belt and a probability corresponding to the information of the candidate isolation belt.

The third obtaining module 30 may be configured to correct the information of the candidate isolation belt based on a preset correction strategy and the probability to obtain information of a target isolation belt.

The generating module 40 may be configured to add an icon corresponding to the information of the target isolation belt on a base map including the target road to generate a map.

Figure 7:
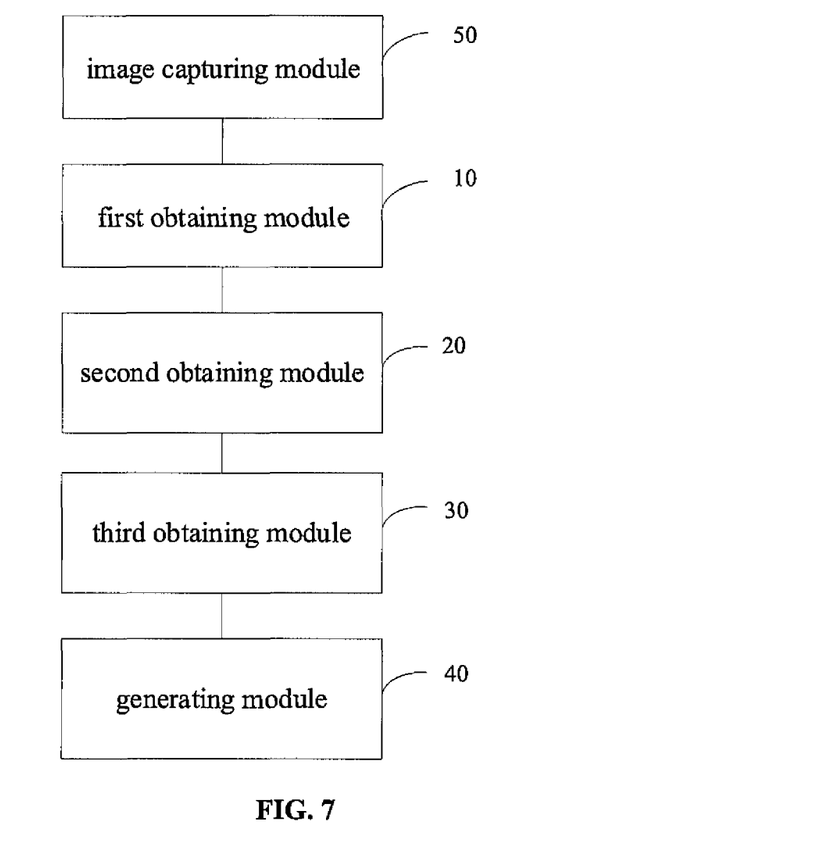
FIG. 7 is a block diagram illustrating an apparatus for generating a map according to embodiments of the present disclosure.

In an example of the present disclosure, as illustrated in FIG. 7, the apparatus may further include an image capturing module 50.

The image capturing module 50 may be further configured to: determine a traffic direction indicated by the target road and a road type of the target road; determine parameters for capturing the street view image based on the traffic direction and the road type; and capture the street view image based on the parameters for capturing the street view image.

In an example of the present disclosure, when multiple candidate isolation belts are included, the third obtaining module 30 may be further configured to: determine a confidence of the information of each candidate isolation belt; determine whether information of a first candidate isolation belt having the confidence greater than a first preset threshold and information of a second candidate isolation belt having the confidence less than or equal to a second preset threshold are included, the second preset threshold being less than the first preset threshold; and in response to determining that the information of the first candidate isolation belt and the information of the second candidate isolation belt are included, correct a type included in the information of the second candidate isolation belt to a type included in the information of the first candidate isolation belt.

In an example of the present disclosure, the third obtaining module 30 may be further configured to: obtain, from an adjacent road that is adjacent to the target road, data of a reference isolation belt corresponding to the information of the candidate isolation belt; determine whether the information of the candidate isolation belt included in the data of the candidate isolation belt is consistent with information of the reference isolation belt included in the data of the reference isolation belt, at the same position of isolation belt; obtain information of an inconsistent candidate isolation belt, and determine whether a probability of the information of the inconsistent candidate isolation is greater than or equal to a probability of information of a corresponding reference isolation belt; and in response to determining that the probability of the information of the inconsistent candidate isolation belt is greater than or equal to the probability of the information of the corresponding reference isolation belt, correct the information of the inconsistent candidate isolation belt to the information of the corresponding reference isolation belt.

It should be noted that the foregoing explanation of the method for generating a map is also applicable to the apparatus for generating a map according to embodiments of the present disclosure. As implementation principles of the apparatus are similar to those of the method, repeated description will be omitted here.

In summary, with the apparatus for generating a map according to embodiments of the present disclosure, the street view image corresponding to the target road is captured. The street view image is input into the preset recognition model to obtain the data of the candidate isolation belt corresponding to the street view image. The data of the candidate isolation belt includes the information of the candidate isolation belt and the probability corresponding to the information of the candidate isolation belt. The information of the candidate isolation belt is corrected based on the preset correction strategy and the probability to obtain the information of the target isolation belt. The icon corresponding to the information of the target isolation belt is added on the base map including the target road to generate the map. Consequently, the information of the isolation belts may be accurately marked on the map, and the navigation performance of the map may be enhanced.

According to embodiments of the present disclosure, the present disclosure further provides an electronic device and a readable storage medium.

Figure 8:
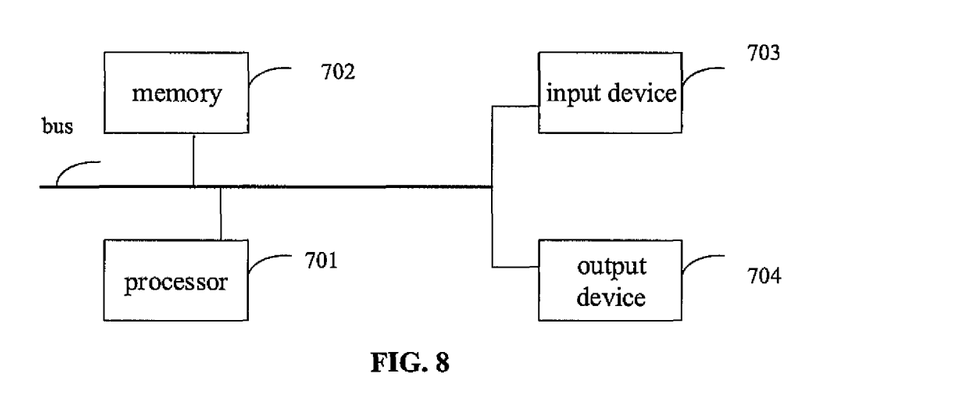
FIG. 8 is a block diagram illustrating an electronic device for implementing a method for generating a map according to embodiments of the present disclosure.

FIG. 8 is a block diagram illustrating an electronic device for implementing a method for generating a map according to embodiments of the present disclosure. The electronic device is intended to represent various forms of digital computers, such as a laptop computer, a desktop computer, a workbench, a personal digital assistant, a server, a blade server, a mainframe computer and other suitable computers. The electronic device may also represent various forms of mobile devices, such as a personal digital assistant, a cellular phone, a smart phone, a wearable device and other similar computing devices. Components shown herein, their connections and relationships as well as their functions are merely examples, and are not intended to limit the implementation of the present disclosure described and/or required herein.

As illustrated in FIG. 8, the electronic device includes: one or more processors 701, a memory 702, and interfaces for connecting various components, including a high-speed interface and a low-speed interface. The components are interconnected by different buses and may be mounted on a common motherboard or otherwise installed as required. The processor may process instructions executed within the electronic device, including instructions stored in or on the memory to display graphical information of the GUI on an external input/output device (such as a display device coupled to the interface). In other embodiments, when necessary, multiple processors and/or multiple buses may be used with multiple memories. Similarly, multiple electronic devices may be connected, each providing some of the necessary operations (for example, as a server array, a group of blade servers, or a multiprocessor system). One processor 701 is taken as an example in FIG. 8.

The memory 702 is a non-transitory computer-readable storage medium according to the embodiments of the present disclosure. The memory stores instructions executable by at least one processor, so that the at least one processor executes the method provided by the present disclosure. The non-transitory computer-readable storage medium according to the present disclosure stores computer instructions, which are configured to make the computer execute the method provided by the present disclosure.

As a non-transitory computer-readable storage medium, the memory 702 may be configured to store non-transitory software programs, non-transitory computer executable programs and modules, such as program instructions/modules (for example, the first obtaining module 10, the second obtaining module 20, the third obtaining module 30 and the generating module 40 illustrated in FIG. 6) corresponding to the method for generating a map according to embodiments of the present disclosure. The processor 701 executes various functional applications and performs data processing of the server by running non-transitory software programs, instructions and modules stored in the memory 702, that is, the method for generating a map according to the foregoing method embodiments is implemented.

The memory 702 may include a storage program area and a storage data area, where the storage program area may store an operating system and applications required for at least one function; and the storage data area may store data created according to the use of the electronic device, and the like. In addition, the memory 702 may include a high-speed random-access memory, and may further include a non-transitory memory, such as at least one magnetic disk memory, a flash memory device, or other non-transitory solid-state memories. In some embodiments, the memory 702 may optionally include memories remotely disposed with respect to the processor 701, and these remote memories may be connected to the electronic device through a network. Examples of the network include, but are not limited to, the Internet, an intranet, a local area network, a mobile communication network, and combinations thereof.

The electronic device configured to implement the method for generating a map may further include an input device 703 and an output device 704. The processor 701, the memory 702, the input device 703 and the output device 704 may be connected through a bus or in other manners. FIG. 8 is illustrated by establishing the connection through a bus.

The input device 703 may receive input numeric or character information, and generate key signal inputs related to user settings and function control of the electronic device, such as a touch screen, a keypad, a mouse, a trackpad, a touchpad, a pointing stick, one or more mouse buttons, trackballs, joysticks and other input devices. The output device 704 may include a display device, an auxiliary lighting device (for example, an LED), a haptic feedback device (for example, a vibration motor), and so on. The display device may include, but is not limited to, a liquid crystal display (LCD), a light emitting diode (LED) display and a plasma display. In some embodiments, the display device may be a touch screen.

Various implementations of systems and technologies described herein may be implemented in digital electronic circuit systems, integrated circuit systems, application-specific ASICs (application-specific integrated circuits), computer hardware, firmware, software, and/or combinations thereof. These various implementations may include: being implemented in one or more computer programs that are executable and/or interpreted on a programmable system including at least one programmable processor. The programmable processor may be a dedicated or general-purpose programmable processor that may receive data and instructions from a storage system, at least one input device and at least one output device, and transmit the data and instructions to the storage system, the at least one input device and the at least one output device.

These computing programs (also known as programs, software, software applications, or codes) include machine instructions of a programmable processor, and may implement these calculation procedures by utilizing high-level procedures and/or object-oriented programming languages, and/or assembly/machine languages. As used herein, terms "machine-readable medium" and "computer-readable medium" refer to any computer program product, device and/or apparatus configured to provide machine instructions and/or data to a programmable processor (for example, a magnetic disk, an optical disk, a memory and a programmable logic device (PLD)), and includes machine-readable media that receive machine instructions as machine-readable signals. The term "machine-readable signals" refers to any signal used to provide machine instructions and/or data to a programmable processor.

In order to provide interactions with the user, the systems and technologies described herein may be implemented on a computer having: a display device (for example, a cathode ray tube (CRT) or a liquid crystal display (LCD) monitor) for displaying information to the user; and a keyboard and a pointing device (such as a mouse or trackball) through which the user may provide input to the computer. Other kinds of devices may also be used to provide interactions with the user; for example, the feedback provided to the user may be any form of sensory feedback (e.g., visual feedback, auditory feedback or haptic feedback); and input from the user may be received in any form (including acoustic input, voice input or tactile input).

The systems and technologies described herein may be implemented in a computing system that includes back-end components (for example, as a data server), a computing system that includes middleware components (for example, an application server), or a computing system that includes front-end components (for example, a user computer with a graphical user interface or a web browser, through which the user may interact with the implementation of the systems and technologies described herein), or a computing system including any combination of the back-end components, the middleware components or the front-end components. The components of the system may be interconnected by digital data communication (e.g., a communication network) in any form or medium. Examples of the communication network include: a local area network (LAN), a wide area network (WAN), and the Internet.

Computer systems may include a client and a server. The client and server are generally remote from each other and typically interact through the communication network. A client-server relationship is generated by computer programs running on respective computers and having a client-server relationship with each other.

It should be understood that various forms of processes shown above may be reordered, added or deleted. For example, the blocks described in the present disclosure may be executed in parallel, sequentially, or in different orders. As long as the desired results of the technical solution disclosed in the present disclosure may be achieved, there is no limitation herein.

The foregoing specific implementations do not constitute a limit on the protection scope of the present disclosure. It should be understood by those skilled in the art that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for generating a map, comprising:
   obtaining a street view image corresponding to a target road;
   inputting the street view image into a preset recognition model to obtain data of a candidate isolation belt corresponding to the street view image, the data of the candidate isolation belt comprising information of the candidate isolation belt and a probability corresponding to the information of the candidate isolation belt, wherein the isolation belt comprises physical objects existing on a road for isolation and virtual lines for isolation;
   correcting the information of the candidate isolation belt based on a preset correction strategy and the probability to obtain information of a target isolation belt; and
   adding an icon corresponding to the information of the target isolation belt on a base map comprising the target road to generate a map;
   wherein when a plurality of candidate isolation belts are comprised, correcting the information of the candidate isolation belt based on the preset correction strategy and the probability to obtain the information of the target isolation belt comprises:
   determining a confidence of information of each candidate isolation belt;
   determining whether information of a first candidate isolation belt having the confidence greater than a first preset threshold and information of a second candidate isolation belt having the confidence less than or equal to a second preset threshold are comprised, the second preset threshold being less than the first preset threshold; and
   in response to determining that the information of the first candidate isolation belt and the information of the second candidate isolation belt are comprised, correcting a type of the second candidate isolation belt comprised in the information of the second candidate isolation belt to a type of the first candidate isolation belt comprised in the information of the first candidate isolation belt.

2. The method of claim 1, further comprising:
   determining a traffic direction indicated by the target road and a road type of the target road;
   determining parameters for capturing the street view image based on the traffic direction and the road type; and
   capturing the street view image based on the parameters.

3. The method of claim 1, wherein determining the confidence of the information of each candidate isolation belt comprises:
   dividing pieces of information of the plurality of candidate isolation belts into at least one set of information based on a type of each candidate insolation belt comprised in the information of each candidate isolation belt, the candidate isolation belts within each set being of the same type; and for each set, determining the number of pieces of information of the candidate isolation belts comprised in the respective set, and determining the confidence of the information of each candidate isolation belt comprised in the respective set based on the number.

4. The method of claim 3, further comprising:
for each set, averaging probabilities of information of all candidate isolation belts comprised in the respective set as an average value, and correcting the confidence based on the average value.

5. The method of claim 3, further comprising:
determining a position of each candidate isolation belt comprised in each set; and
determining the number of continuous and adjacent candidate isolation belts based on the position of each candidate isolation belt, and correcting the confidence based on the number of continuous and adjacent candidate isolation belt.

6. The method of claim 1, wherein correcting the information of the candidate isolation belt based on the preset correction strategy and the probability to obtain the information of the target isolation belt comprises:
obtaining, from an adjacent road that is adjacent to the target road, data of a reference isolation belt corresponding to the data of the candidate isolation belt, wherein the reference isolation belt is at a same position as the candidate isolation belt on the adjacent road that is adjacent to the target road;
determining whether the information of the candidate isolation belt from the data of the candidate isolation belt is consistent with information of the reference isolation belt from the data of the reference isolation belt that is at a same position as the candidate isolation belt;
determining information of an inconsistent candidate isolation belt, and determining whether a probability of the information of inconsistent candidate isolation belt is greater than or equal to a probability of information of a corresponding reference isolation belt; and
in response to determining that the probability of the information of the inconsistent candidate isolation belt is greater than or equal to the probability of the information of the corresponding reference isolation belt, correcting the information of the inconsistent candidate isolation belt to the information of the corresponding reference isolation belt.

7. An electronic device, comprising:
at least one processor; and
a memory communicatively connected to the at least one processor; wherein,
the memory comprises instructions executable by the at least one processor therein, and when the instructions are executed by the at least one processor, the at least one processor is configured to:
obtain a street view image corresponding to a target road;
input the street view image into a preset recognition model to obtain data of a candidate isolation belt corresponding to the street view image, the data of the candidate isolation belt comprising information of the candidate isolation belt and a probability corresponding to the information of the candidate isolation belt, wherein the isolation belt comprises physical objects existing on a road for isolation and virtual lines for isolation;
correct the information of the candidate isolation belt based on a preset correction strategy and the probability to obtain information of a target isolation belt; and
add an icon corresponding to the information of the target isolation belt on a base map comprising the target road to generate a map;
wherein a plurality of candidate isolation belts are comprised, and the at least one processor is configured to:
determine a confidence of information of each candidate isolation belt;
determine whether information of a first candidate isolation belt having the confidence greater than a first preset threshold and information of a second candidate isolation belt having the confidence less than or equal to a second preset threshold are comprised, the second preset threshold being less than the first preset threshold; and
in response to determining that the information of the first candidate isolation belt and the information of the second candidate isolation belt are comprised, correct a type of the second candidate isolation belt comprised in the information of the second candidate isolation belt to a type of the first candidate isolation belt comprised in the information of the first candidate isolation belt.

8. The electronic device of claim 7, wherein the at least one processor is further configured to:
determine a traffic direction indicated by the target road and a road type of the target road;
determine parameters for capturing the street view image based on the traffic direction and the road type; and
capture the street view image based on the parameters.

9. The electronic device of claim 7, wherein the at least one processor is configured to:
divide pieces of information of the plurality of candidate isolation belts into at least one set of information based on a type of each candidate insolation belt comprised in the information of each candidate isolation belt, the candidate isolation belts within each set being of the same type; and
for each set, determine the number of pieces of information of the candidate isolation belts comprised in the respective set, and determine the confidence of the information of each candidate isolation belt comprised in the respective set based on the number.

10. The electronic device of claim 9, wherein the at least one processor is further configured to:
for each set, average probabilities of information of all candidate isolation belts comprised in the respective set as an average value, and correct the confidence based on the average value.

11. The electronic device of claim 9, wherein the at least one processor is further configured to:
determine a position of each candidate isolation belt comprised in each set; and
determine the number of continuous and adjacent candidate isolation belts based on the position of each candidate isolation belt, and correct the confidence based on the number of continuous and adjacent candidate isolation belt.

12. The electronic device of claim 7, wherein the at least one processor is configured to:
obtain, from an adjacent road that is adjacent to the target road, data of a reference isolation belt corresponding to the data of the candidate isolation belt, wherein the reference isolation belt is at a same position as the candidate isolation belt on the adjacent road that is adjacent to the target road;
determine whether the information of the candidate isolation belt from the data of the candidate isolation belt is consistent with information of the reference isolation belt from the data of the reference isolation belt that is at a same position as the candidate isolation belt;

determine information of an inconsistent candidate isolation belt, and determine whether a probability of the information of inconsistent candidate isolation belt is greater than or equal to a probability of information of a corresponding reference isolation belt; and in response to determining that the probability of the information of the inconsistent candidate isolation belt is greater than or equal to the probability of the information of the corresponding reference isolation belt, correct the information of the inconsistent candidate isolation belt to the information of the corresponding reference isolation belt.

13. A non-transitory computer-readable storage medium, having a computer instruction stored thereon, wherein the computer instruction is configured to cause a computer to perform a method for generating a map, the method comprising:

obtaining a street view image corresponding to a target road;

inputting the street view image into a preset recognition model to obtain data of a candidate isolation belt corresponding to the street view image, the data of the candidate isolation belt comprising information of the candidate isolation belt and a probability corresponding to the information of the candidate isolation belt, wherein the isolation belt comprises physical objects existing on a road for isolation and virtual lines for isolation;

correcting the information of the candidate isolation belt based on a preset correction strategy and the probability to obtain information of a target isolation belt; and adding an icon corresponding to the information of the target isolation belt on a base map comprising the target road to generate a map;

wherein when a plurality of candidate isolation belts are comprised, correcting the information of the candidate isolation belt based on the preset correction strategy and the probability to obtain the information of the target isolation belt comprises:

determining a confidence of information of each candidate isolation belt;

determining whether information of a first candidate isolation belt having the confidence greater than a first preset threshold and information of a second candidate isolation belt having the confidence less than or equal to a second preset threshold are comprised, the second preset threshold being less than the first preset threshold; and in response to determining that the information of the first candidate isolation belt and the information of the second candidate isolation belt are comprised, correcting a type of the second candidate isolation belt comprised in the information of the second candidate isolation belt to a type of the first candidate isolation belt comprised in the information of the first candidate isolation belt.

14. The non-transitory computer-readable storage medium of claim 13, wherein the method further comprises:

determining a traffic direction indicated by the target road and a road type of the target road;

determining parameters for capturing the street view image based on the traffic direction and the road type; and capturing the street view image based on the parameters.

15. The non-transitory computer-readable storage medium of claim 13, wherein determining the confidence of the information of each candidate isolation belt comprises:

dividing pieces of information of the plurality of candidate isolation belts into at least one set of information based on a type of each candidate insolation belt comprised in the information of each candidate isolation belt, the candidate isolation belts within each set being of the same type; and for each set, determining the number of pieces of information of the candidate isolation belts comprised in the respective set, and determining the confidence of the information of each candidate isolation belt comprised in the respective set based on the number.

16. The non-transitory computer-readable storage medium of claim 15, wherein the method further comprises:

for each set, averaging probabilities of information of all candidate isolation belts comprised in the respective set as an average value, and correcting the confidence based on the average value;

or determining a position of each candidate isolation belt comprised in each set; and determining the number of continuous and adjacent candidate isolation belts based on the position of each candidate isolation belt, and correcting the confidence based on the number of continuous and adjacent candidate isolation belt.

17. The non-transitory computer-readable storage medium of claim 13, wherein correcting the information of the candidate isolation belt based on the preset correction strategy and the probability to obtain the information of the target isolation belt comprises:

obtaining, from an adjacent road that is adjacent to the target road, data of a reference isolation belt corresponding to the data of the candidate isolation belt;

determining whether the information of the candidate isolation belt from the data of the candidate isolation belt is consistent with information of the reference isolation belt from the data of the reference isolation belt that is at a same position as the candidate isolation belt;

determining information of an inconsistent candidate isolation belt, and determining whether a probability of the information of inconsistent candidate isolation belt is greater than or equal to a probability of information of a corresponding reference isolation belt; and in response to determining that the probability of the information of the inconsistent candidate isolation belt is greater than or equal to the probability of the information of the corresponding reference isolation belt, correcting the information of the inconsistent candidate isolation belt to the information of the corresponding reference isolation belt.

* * * * *